(12) United States Patent
Agati

(10) Patent No.: US 11,154,114 B2
(45) Date of Patent: Oct. 26, 2021

(54) LIGHTWEIGHT THERMOPLASTIC SOLES

(71) Applicant: DANSKO, LLC, West Grove, PA (US)

(72) Inventor: Salvatore P. Agati, Kennet Square, PA (US)

(73) Assignee: Dansko, LLC, West Grove, PA (US)

( * ) Notice: Subject to any disclaimer, the term of this patent is extended or adjusted under 35 U.S.C. 154(b) by 133 days.

(21) Appl. No.: 15/601,643

(22) Filed: May 22, 2017

(65) Prior Publication Data
US 2017/0332728 A1    Nov. 23, 2017

Related U.S. Application Data

(60) Provisional application No. 62/339,555, filed on May 20, 2016.

(51) Int. Cl.
| | | |
|---|---|---|
| A43B 13/04 | (2006.01) |
| A43B 13/14 | (2006.01) |
| A43B 3/10 | (2006.01) |
| A43B 13/12 | (2006.01) |
| A43B 13/22 | (2006.01) |
| B29D 35/14 | (2010.01) |
| B29D 35/00 | (2010.01) |
| B29D 35/12 | (2010.01) |
| B29K 23/00 | (2006.01) |
| B29K 75/00 | (2006.01) |

(52) U.S. Cl.
CPC ............ *A43B 13/04* (2013.01); *A43B 3/108* (2013.01); *A43B 13/12* (2013.01); *A43B 13/14* (2013.01); *A43B 13/141* (2013.01); *A43B 13/223* (2013.01); *B29D 35/0054* (2013.01); *B29D 35/122* (2013.01); *B29D 35/142* (2013.01); *B29K 2023/083* (2013.01); *B29K 2075/00* (2013.01)

(58) Field of Classification Search
CPC ......... A43B 13/04; A43B 3/108; A43B 13/14; A43B 13/12; A43B 13/223; A43B 13/141; A43B 13/42; A43B 7/144; A43B 13/125; A43B 13/127; A43B 13/16; A43B 7/148; A43B 7/1485; A43B 13/188; B29D 35/142; B29D 35/122; B29D 35/0054; B29K 2075/00; B29K 2023/083
USPC ........................... 36/25 R, 30 R, 30 A, 32 R
See application file for complete search history.

(56) References Cited

U.S. PATENT DOCUMENTS

| | | |
|---|---|---|
| 4,030,213 A | 6/1977 | Daswick |
| 4,041,619 A | 8/1977 | Sapper |

(Continued)

FOREIGN PATENT DOCUMENTS

| | | |
|---|---|---|
| CN | 101402760 | 4/2009 |
| CN | 102215710 | 10/2011 |

(Continued)

OTHER PUBLICATIONS

Office Action dated Aug. 20, 2020 issued in Chinese Patent Application No. 201710364511.5.

*Primary Examiner* — Khoa D Huynh
*Assistant Examiner* — Aiying Zhao
(74) *Attorney, Agent, or Firm* — Cozen O'Connor

(57) ABSTRACT

An EVA sole having an upper face and a bottom, comprising an inscribed channel and a plurality of recesses positioned on the upper face, a TPU material disposed of within the inscribed channel, and a nylon stabilizer, which is bonded to the upper face inside of the inscribed channel.

7 Claims, 7 Drawing Sheets

(56) References Cited

U.S. PATENT DOCUMENTS

| | | | |
|---|---|---|---|
| 4,302,892 A * | 12/1981 | Adamik | A43B 13/188 36/31 |
| RE31,173 E | 3/1983 | Daswick | |
| 4,408,402 A * | 10/1983 | Looney | A43B 13/42 36/43 |
| 4,667,423 A * | 5/1987 | Autry | A43B 13/12 36/102 |
| 5,131,173 A | 7/1992 | Wolf | |
| 5,147,589 A | 9/1992 | Chang et al. | |
| 5,503,786 A | 4/1996 | Yang | |
| 5,554,694 A | 9/1996 | Crow | |
| 5,560,877 A | 10/1996 | Yung et al. | |
| 5,695,850 A | 12/1997 | Crow | |
| 5,718,064 A | 2/1998 | Pyle | |
| 5,868,981 A | 2/1999 | Bisconti | |
| 6,045,733 A | 4/2000 | Chu et al. | |
| 6,120,880 A | 9/2000 | Crow | |
| 6,129,798 A | 10/2000 | Yang | |
| 6,226,894 B1 | 5/2001 | Bray et al. | |
| 6,238,602 B1 | 5/2001 | Liu | |
| 6,516,241 B1 | 2/2003 | Stotsky | |
| 6,540,864 B1 | 4/2003 | Chi | |
| 6,589,630 B1 | 7/2003 | Crow | |
| 6,681,500 B2 | 1/2004 | Moretti | |
| 7,685,740 B2 | 3/2010 | Sokolowski | |
| 8,246,881 B2 | 8/2012 | Maranan et al. | |
| 8,266,825 B2 | 9/2012 | Pfister | |
| 8,307,569 B2 | 11/2012 | McInnis et al. | |
| 8,424,221 B2 | 4/2013 | Litchfield et al. | |
| 9,003,677 B2 | 4/2015 | Goldsmith et al. | |
| 9,321,200 B2 | 4/2016 | Stone et al. | |
| 2007/0017122 A1 * | 1/2007 | Feller | A43B 1/0072 36/35 R |
| 2007/0107264 A1 | 5/2007 | Meschter et al. | |
| 2010/0031531 A1 * | 2/2010 | Baucom | A43B 13/188 36/44 |
| 2010/0098797 A1 | 4/2010 | Davis et al. | |
| 2010/0107448 A1 | 5/2010 | Fallow et al. | |
| 2010/0251565 A1 | 10/2010 | Litchfield et al. | |
| 2011/0126422 A1 | 6/2011 | Vattes et al. | |
| 2013/0036627 A1 | 2/2013 | Wan et al. | |
| 2013/0291409 A1 * | 11/2013 | Reinhardt | A43B 13/04 36/30 R |
| 2014/0259801 A1 * | 9/2014 | Grondin | A43B 13/187 36/30 R |
| 2016/0270475 A1 * | 9/2016 | Foxen | A43B 13/42 |
| 2017/0332727 A1 * | 11/2017 | Beck | A43B 13/125 |
| 2017/0332728 A1 * | 11/2017 | Agati | A43B 3/108 |

FOREIGN PATENT DOCUMENTS

| | | | |
|---|---|---|---|
| CN | 104379011 | 2/2015 | |
| EP | 1559337 | 8/2005 | |
| KR | 200319548 Y1 * | 7/2003 | A43B 13/40 |
| KR | 20140104210 A * | 8/2014 | |
| WO | 2014143732 A1 | 9/2014 | |
| WO | WO 2016/092353 | 5/2015 | |

* cited by examiner

LIGHTWEIGHT THERMOPLASTIC SOLES

FIELD OF INVENTION

The present application is generally related to shoe soles and processes for making the same utilizing a lightweight thermoplastic frame, for example, made of ethylene vinyl acetate (EVA), an inscribed rigid material in the frame, and a rigid stabilizer adhered to an upper face of the frame, to generate a much lighter sole than prior and existing stapled soles.

BACKGROUND OF INVENTION

In the manufacture of ordinary clog style shoes, the upper is stapled to the sole of the shoe. The requirement to staple the shoe, thus requires that the sole comprises a rigid frame on the inside so that the staple enters the rigid frame and is maintained. Accordingly, use of materials such as soft foams and other materials have less weight, such as those used in athletic shoes, are unsuitable for use within the frame, as they would prevent the ability to staple the upper to the sole.

Clogs or other types of shoes having a stapled upper, are used in many industries for their stability, durability, comfort, and ability for cleanliness. Many people wear clogs in industries whom spend significant amounts of time on their feet during the day, such as the medical industry. The clogs or shoes, thus, are worn by individuals who walk significant distances during the day or who need to stand for long durations of time. Reducing the weight of the sole would reduce the overall effort exerted by an individual who wears clogs during the day, thus reducing fatigue.

SUMMARY OF INVENTION

The present invention provides for a lightweight clog sole comprising an EVA frame having a channel inscribed within the upper face of the sole, wherein the channel is filled with a thermoplastic polyurethane (TPU) material and, disposed of in between the inscribed channel is a rigid plate; wherein the TPU material, rigid plate, and the EVA frame are compression molded together to generate a lightweight sole.

An embodiment is directed to a show sole comprising a lightweight frame, a rigid material, and a nylon stabilizer, wherein the lightweight frame, having an upper face, comprises an inscribed channel on said upper face filled with a rigid material and a nylon stabilizer positioned on said upper face between the perimeter oriented inscribed channel.

A further embodiment is directed to an EVA sole having an upper face and a bottom, comprising an inscribed channel and a plurality of recesses positioned on the upper face, a TPU material disposed of within the inscribed channel, and a nylon stabilizer, which is bonded to the upper face inside of the inscribed channel, wherein the TPU material and nylon stabilizer are molded to said sole.

A further embodiment is directed to a shoe sole comprising a frame of a lightweight polymer having an upper face and a bottom, an inscribed channel in said upper face of said frame comprising a rigid material, and a support member affixed to said upper face.

A further embodiment is directed to an EVA sole having a lightweight frame comprised of an EVA polymer, said frame having an outer edge, an upper face, and a bottom, disposed of on said upper face and inside said outer edge is an inscribed channel; plurality of recesses positioned on the upper face extending vertically, a rigid material disposed of within said inscribed channel, and a support member, affixed to said upper face and positioned over at least one of said plurality of recesses position on the upper face.

A further embodiment is directed to a process for manufacturing an EVA sole comprising: molding an EVA outsole (frame) having an upper face and a bottom face and comprising on said upper face an inscribed channel and a plurality of recesses that are positioned vertically between the upper face and the bottom face but do not extend through to the bottom face; applying a TPU material into the inscribed channel, into at least one of the plurality of recesses in the upper face, and applying TPU material onto the central arch section of the sole applying an adhesive to a bottom side of a nylon stabilizer, wherein said stabilizer has a bottom and a top and defines a shape that generally follows the curvature of the outsole and having two protrusions at the front section on each side of the lateral axis of the stabilizer; applying said bottom of said nylon stabilizer to the upper face of the EVA outsole; and molding the EVA sole, the TPU material and the nylon stabilizer in an appropriate mold under a temperature and pressure sufficient to cure and chemically bind the TPU to the EVA and to bind and mold the nylon stabilizer to the upper face of the EVA sole.

A process for manufacturing a lightweight polymer sole comprising: manufacturing a polymer into the shape of a shoe frame, having an upper face and a bottom face and comprising on said upper face an inscribed channel and a plurality of recesses that are positioned vertically between the upper face and the bottom face; applying a rigid moldable polymer material into the inscribed channel and into at least one of the plurality of recesses on said upper face; providing a rigid stabilizer having perimeter dimensions smaller than the space within the inscribed channel; applying an adhesive to the bottom of the stabilizer; and molding the frame, the rigid material and the stabilizer in an appropriate mold under a temperature and pressure sufficient to cure and chemically bind the rigid material to the frame and to bind and mold the stabilizer to the upper face of the frame.

A sole made by a process as described herein.

DETAILED DESCRIPTION OF THE EMBODIMENTS

Herein are described embodiments of a lightweight sole and methods of manufacturing the same. In preferred embodiments, the sole comprises an ethylene vinyl acetate (EVA) frame, a nylon rigid member, and a thermoplastic polyurethane (TPU) filler, wherein through a compression molding process, the materials are molded together to form a sole being lighter than prior generation soles for the same shoes.

The weight savings is generated by manufacturing the sole with a lightweight material, for example, EVA, and by incorporating only necessary amounts of TPU and nylon for support per sole. Therefore, based upon the processes described herein, the resultant sole, once formed and attached to an appropriate upper, is approximately 10 ounces lighter. Such weight reduction greatly reduces energy expenditure and fatigue to someone wearing a shoe or a clog on a daily basis.

The general shape of the sole maintains the traditional profile of a shoe sole, having a forefoot, a midfoot (arch) and heel sections. The sole may comprised a raised heel for aesthetics and for comfort, with the heel being slightly higher than the forefoot. However, the materials, the process, and the resulting sole are entirely transformed into a new product having significant weight savings over prior iterations of the sole.

Figure 1:
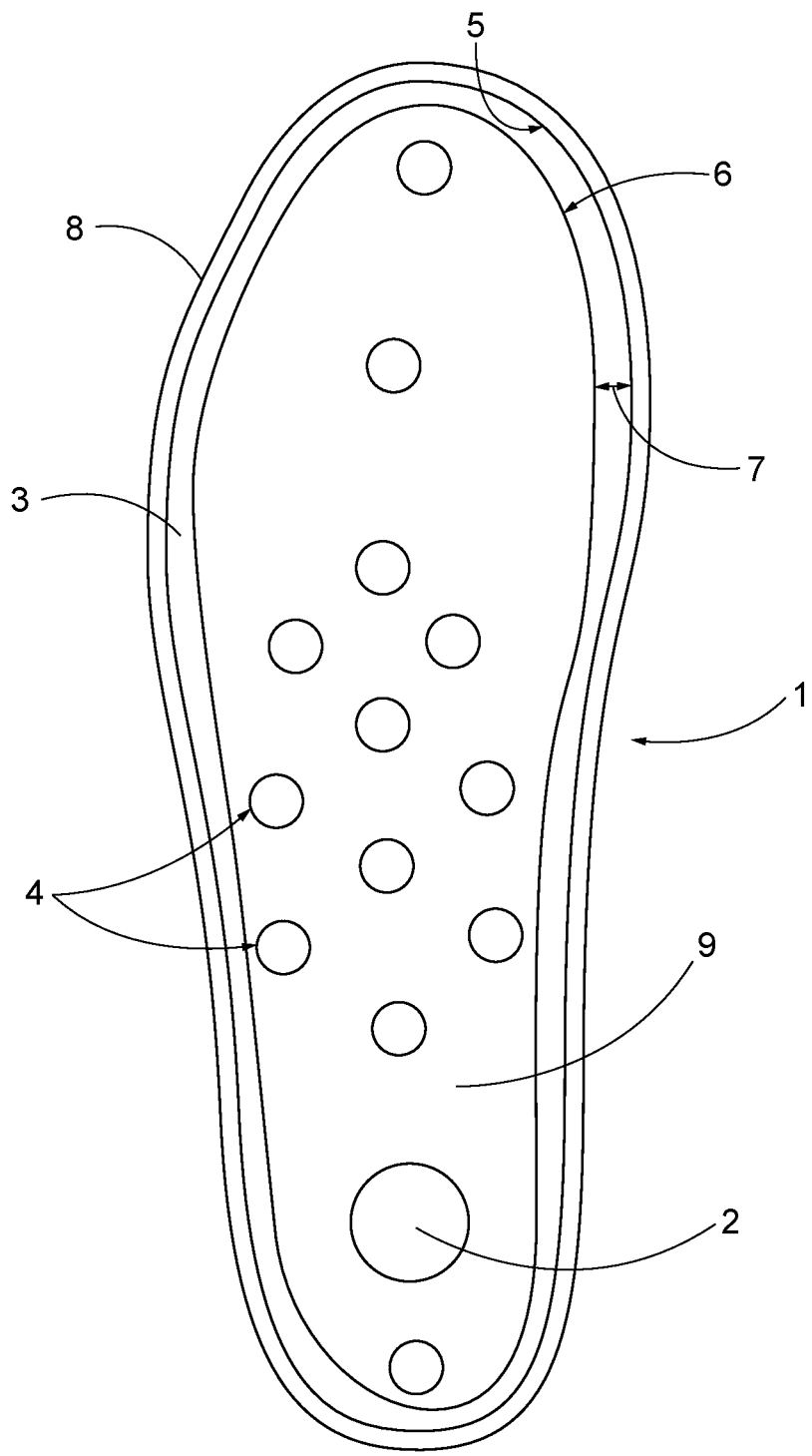
FIG. 1 depicts a frame having a channel inscribing the upper face of the frame, and a plurality of recesses in the upper face.

In view of FIG. 1, depicted is a frame 1 having an inscribed channel 3 positioned inside the outer edge 8 of the sole. Inscribed meaning the channel is within the boundary of the frame, along the perimeter, but have some frame material between the frame outer edge 8 and the channel outer edge 5. The channel 3 is a recess generally following the perimeter of the frame and has a depth of about 3-15 mm and is defined as the width 7 between the outer edge of the channel 5 and the interior edge 6 of the channel. The channel 3 is inscribed along the entirety of the outer edge 8 of the frame 1, to some extent, similar to a moat around a castle or around the perimeter of the sole. The channel 3 is defined to accept a rigid material within the channel, wherein upon construction of the shoe, the upper is stapled into the rigid material of the channel. The frame 1 is preferably molded EVA. However, other polymer materials, plastics, and the like may be utilized. For example, certain viscosities of polyurethane have properties similar to EVA, namely, lightweight, low to medium density and have flexibility. Certain materials have greater flexibility and compression than others, and the particular choice can be made based on the ultimate intended use of the sole, or whether it will have an added rubber or traction material added to the bottom face.

Further depicted in FIG. 1 is a heel support recess 2 and a plurality of arch recesses 4. The heel support recess 2 provides an access point for inserting a rigid material into the recess. This rigid material is utilized to then accept a fastening device to assist in securing the upper or to secure the last, which is utilized in forming the shape of the upper during manufacturing.

The arch recesses 4 extend on the upper face 9, from the top face of the sole to the middle of the sole, a depth of about 3-20 mm, but do not extend completely through the sole. These arch recesses 4 provide for a weight reduction, simply by evacuation of material. However, they also provide for additional support and rigidity to the frame 1, when for example it is manufactured with an EVA material. The support is created as the EVA material comprises a soft, compressible foam core that is surrounded by a skin, wherein the skin has increased rigidity as compared to the underlying foam. Accordingly, each recess increases the amount of the skin material in portions of the frame thus modifying the rigidity and structure of the frame at those points. This increases the stability of the EVA frame in the locations of the recesses, and thus increases the stability of the sole once molded.

Figure 2:
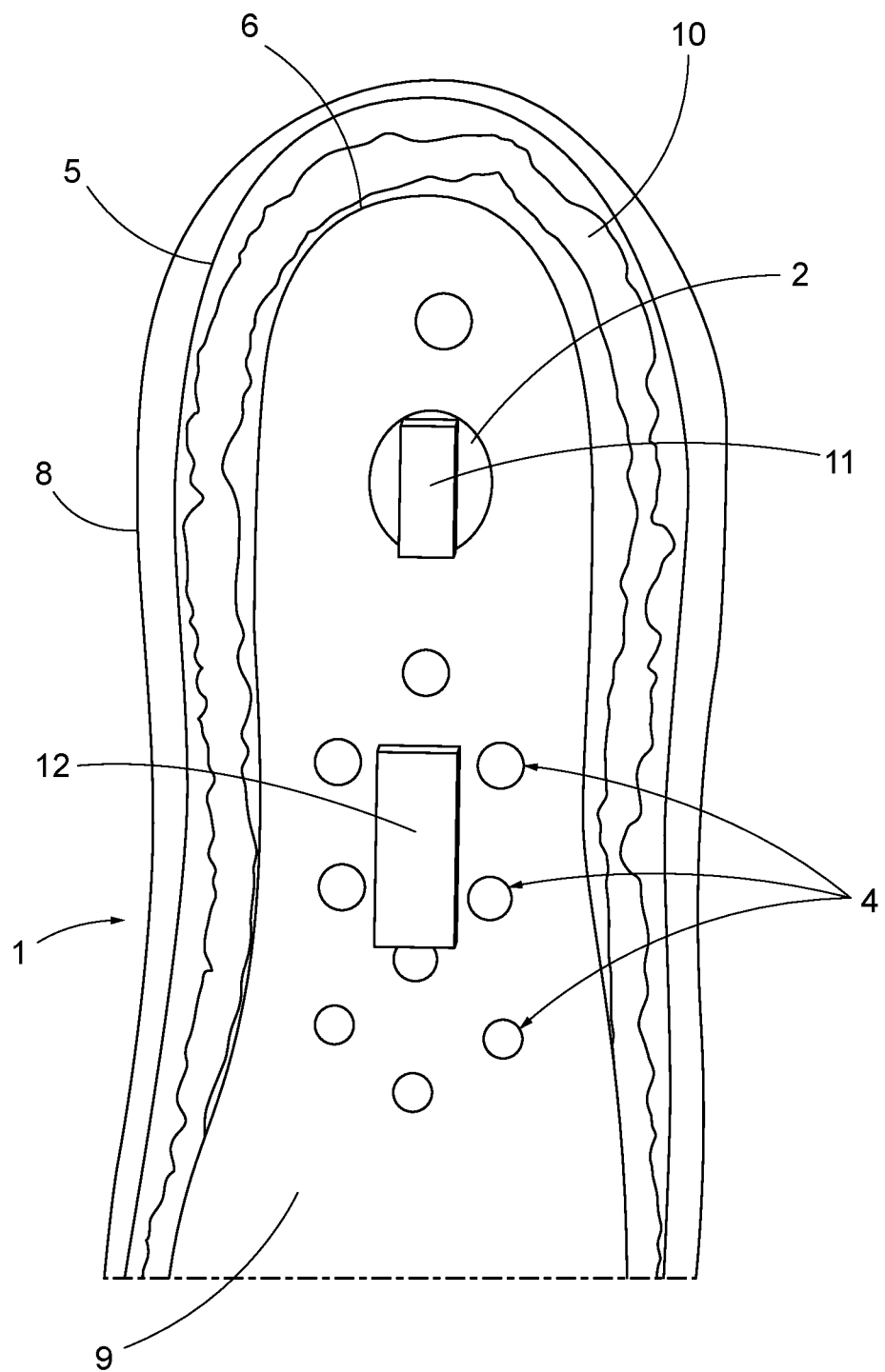
FIG. 2 depicts the upper face of a frame wherein the inscribed channel is filled with a rigid material, for example, Thermoplastic polyurethane (TPU).

FIG. 2 details a step in the manufacturing process when a rigid material 10 is inserted into the channel 3. The rigid material 10, unlike typical polyurethane, is not in liquid form before pressing, but is sufficiently granular or pliable in its uncured form to be inserted into the cavities in the frame 1. Accordingly, the rigid material 10 must be inserted into the channel 3 before it can be molded and compressed to form a portion of the sole.

Indeed, in certain embodiments, the rigid material is TPU, and, once cured is sufficiently rigid and possesses properties wherein a fastening device (such as a nail or staple) can be embedded into the material and hold the fastening device in place. This allows the upper to be stapled or nailed to the sole, where the fastening device penetrates the upper and into the TPU channel. During the manufacturing process, the TPU becomes affixed to the EVA material of the frame, through pressure and bonding. In some embodiments, adhesives may assist this affixing process, however chemical bonding and curing is sufficient in most circumstances.

Additional rigid material is positioned within the heel support recess 2, for example TPU, and thus further comprises the heel TPU material 11, and one also placed across the arch, the arch TPU material 12, adjacent to the arch recesses 4. These positions are necessary to provide additional portions of the sole that can accept a fastening device for manufacturing and/or fastening or supporting a support member 20.

In certain embodiments, the rigid material is TPU. However, in further embodiments, the TPU can be exchanged for another material that can be sufficiently molded and bonded to an EVA material, and also contain sufficient properties to impart rigidity to the channel of the sole as well as having the ability to accept a fastening device, such as a nail or staple. Indeed, the ability to receive the fastening device, and then hold in the upper to the sole is a primary function of the rigid material. Those of skill in the art will recognize that materials other than TPU, such as rigid EVA, and other plastics, polymers, urethanes, or combinations thereof, possess the appropriate physical properties to replace TPU as described in the embodiments herein.

Figure 3:
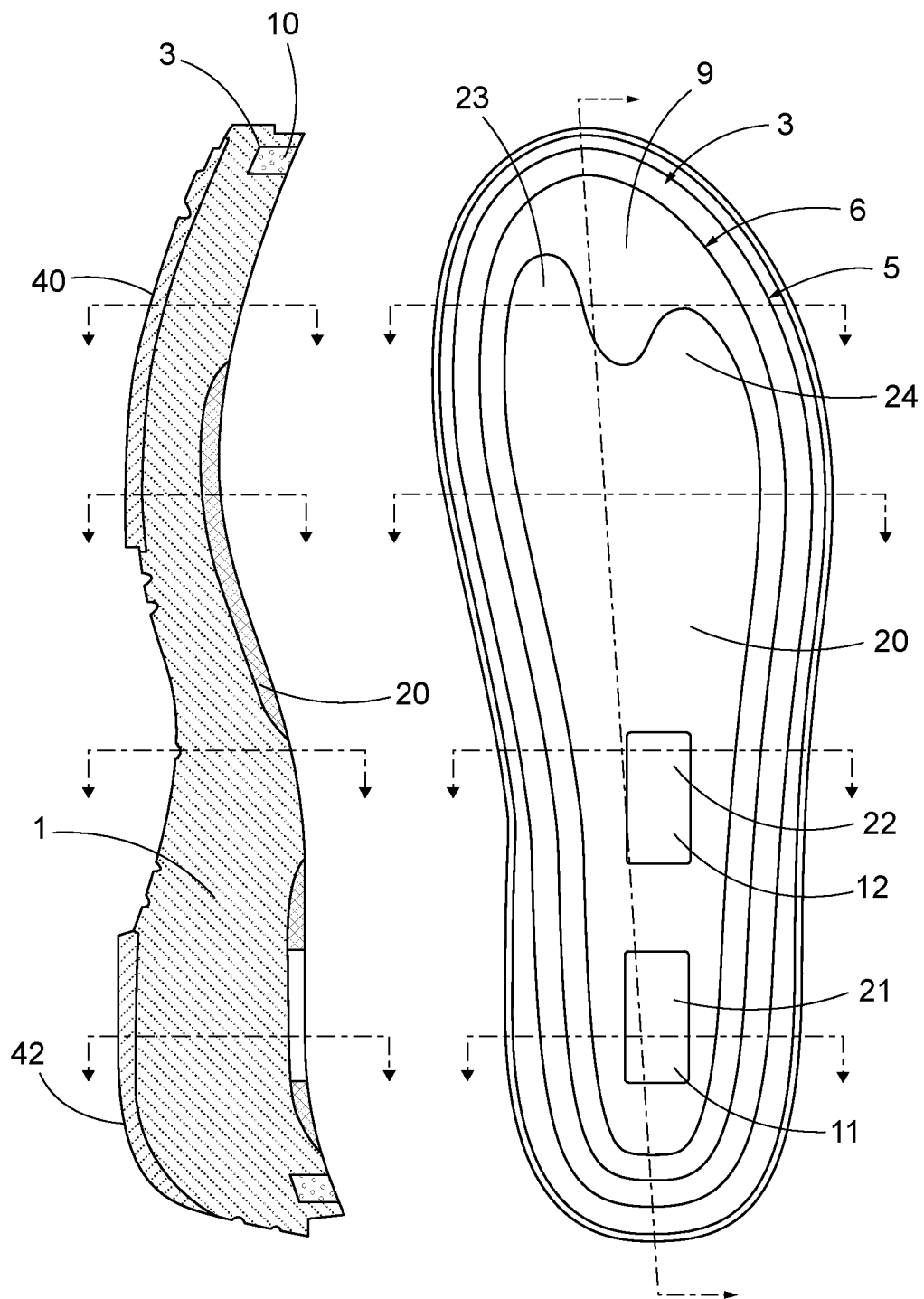
FIG. 3 depicts a cross-sectional view of a sole and a top plan view of the sole as molded with a nylon stabilizer.

FIG. 3 depicts a side profile and a top perspective view of the sole after molding is completed. The left side of FIG. 3 depicts a side cut-through view of a sole. Depicted on the bottom are the traction pads 40 and 42. Also depicted at the top of the sole is the channel 3, which is filled with a rigid material 10. Furthermore, a support 20 is depicted in certain portions of the sole.

Depicted on the right side of FIG. 3 is the support 20, which is embedded and bonded to the frame 1. Specifically, the arch material 12 and the heel material 11 are positioned to fit within a single rectangular arch hole 22 and a single rectangular heel hole 21 of the support 20. These holes and in combination with the TPU materials therein, assist in securing the support 20 in place and ensure that the nylon support is securely attached and bonded to the frame 1.

Figure 4:
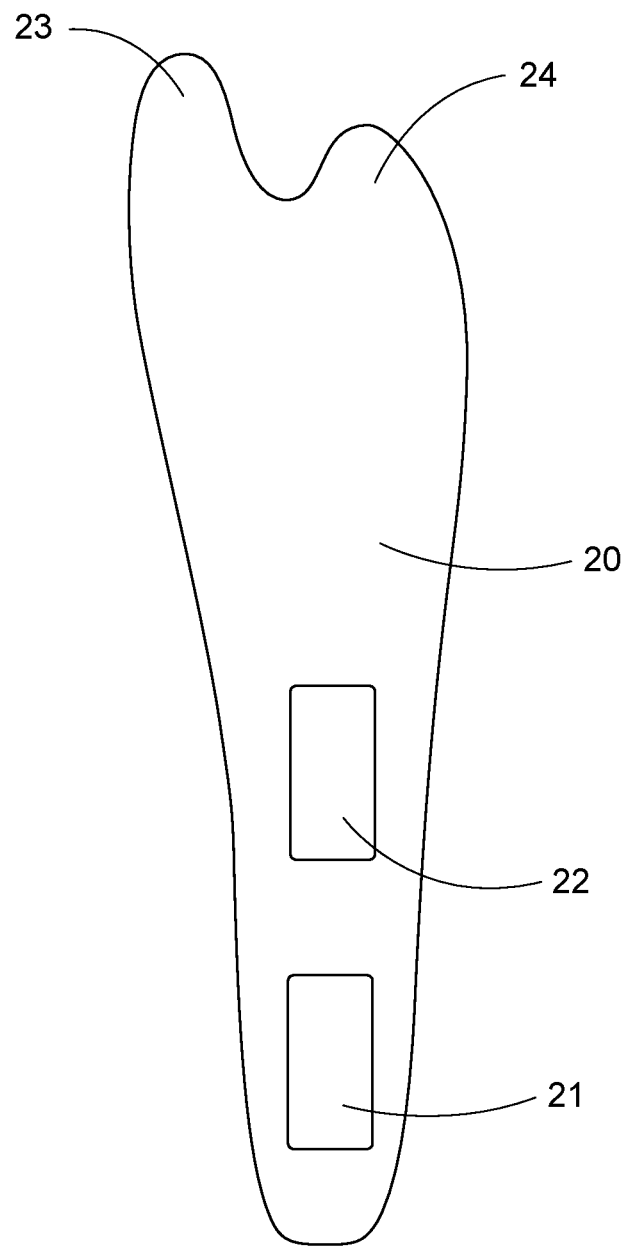
FIG. 4 depicts a stabilizer.

The support 20, as depicted in FIG. 3 and FIG. 4, is intended to be a substantially rigid component, made of a thin and lightweight material, wherein the rigidity of the material can be suitably combined to the sole 1 to increase the rigidity of the sole 1 after compression. The support 20 is necessary because the material that comprises the majority of the frame does not contain sufficient rigidity. Accordingly, to replicate the feel and support found in more rigid materials and soles, a support 20 is affixed to the frame. The support 20 has a curvature along the longitudinal axis to match the contours of the foot when molded, as well as the angle based on the rise of the heel. As can be seen in FIGS. 3 and 4, the support 20 has a heel portion and an arch portion, the entire arch portion only has the single rectangular arch hole 22 and the entire heel portion only has the single rectangular heel hole 21. The single rectangular heel hole 21 and single rectangular arch hole 22 are arranged in alignment with each other and along a longitudinal direction of the shoe sole. At the front end of the support 20, two extended protrusions are positioned at the front of the support 20 on either side of the lateral axis at the toe portion of the sole representing an interior protrusion 23 and an exterior protrusion 24. These protrusions increase the rigidity of the molded sole at about the ball of the foot and the corresponding outside of the foot. When the shoe is molded, the support 20 is molded to take the particular shape of the sole based on the mold utilized. The support 20 has perimeter dimensions to fit within the inner edge of the inscribed channel, and is about 0.5-5 mm in thickness, usually about 0.5-2 mm in thickness.

In preferred embodiments, the support is made of nylon. Nylon is suitable for the support 20, as it can be advantageously modified to take up the shape of the shoe upon molding. However, other suitable rigid and lightweight materials may be suitably exchanged, e.g. polymers, plastics, To mold or adhere the support 20 to the frame 1, an adhesive is applied to the bottom of the support 20, it is then adhered to the upper face 9 of the frame 1, and placed so that the arch hole 22 and the heel hole 21 are positioned over the heel TPU material 11 and the arch TPU material 12 from FIG. 2. Upon molding, these TPU materials fill the arch hole 22 and heel hole 21 and the adhesive further assists to secure the support 20 to the frame. The TPU material in the heel molds into the heel support recess 2 and also expands into the heel plate hole 21 in the nylon plate. Similarly, the arch material 12 is compressed into the arch hole 22 in the nylon plate.

FIG. 4 particularly depicts a support 20 not affixed or molded to the frame 1. Depicted is the heel hole 21, the arch hole 22, and the interior protrusion 23 and exterior protrusion 24. This support 20, is then affixed or molded to the upper face 9 of the frame 1.

Figure 5:
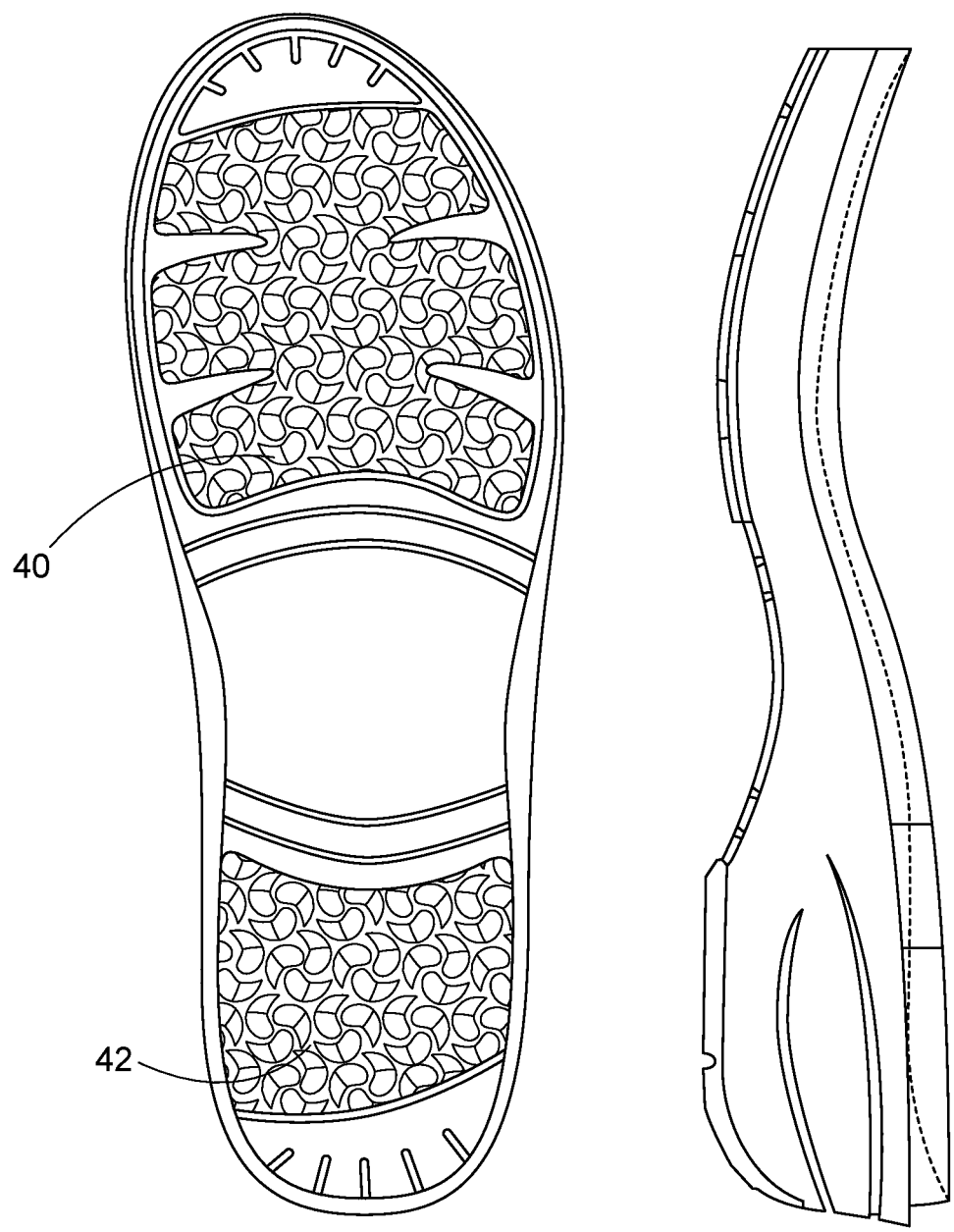
FIG. 5 depicts a side view and a bottom view of a molded sole having a bottom traction pattern.

FIG. 5 depicts a rubber bottom sole comprising rubber sections 40 and 42. After the sole is molded, any number of bottom materials may be added to the sole to increase traction, stability, support, abrasion rate, and wear. However, in certain embodiments, the sole is manufactured to not require an additional bottom material on the sole.

FIGS. 6A-6D depict different cross-sectional cuts of the sole manufactured with the frame as EVA material, TPU as the rigid material, and nylon as the support 20. FIG. 9A shows the channel 3 and that the rigid material 10 has completely filled the channel and is flush with the top of the sole. Additionally, a small portion of the nylon support 20 is depicted near the center of the sole.

Figure 6A:
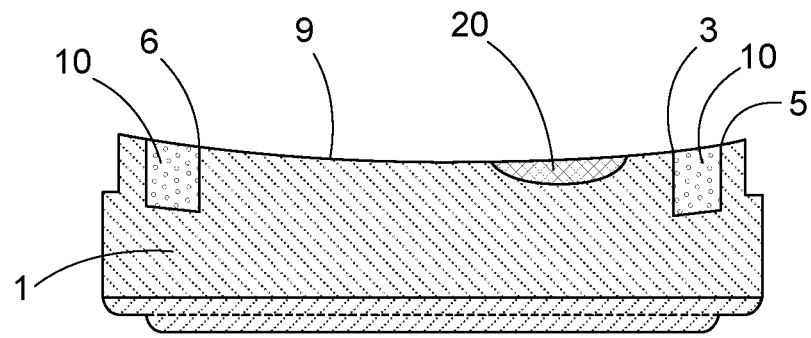
FIGS. 6A-6D depict a cross-sectional views of a molded sole.
Figure 6B:
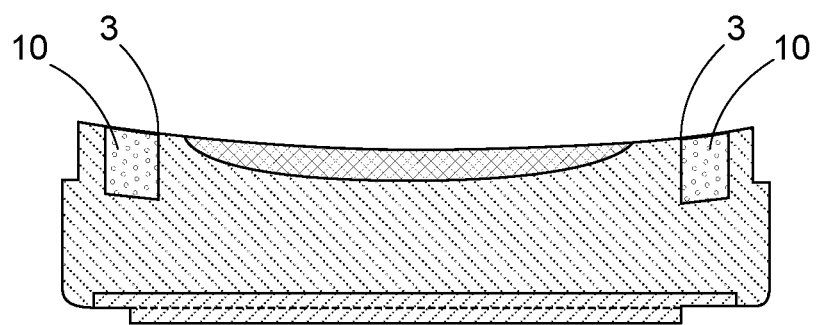

FIG. 6B provides a further image of the sole and again clearly depicts the channel 3 along both sides of the sole and the rigid material 10 filled therein.

Figure 6C:
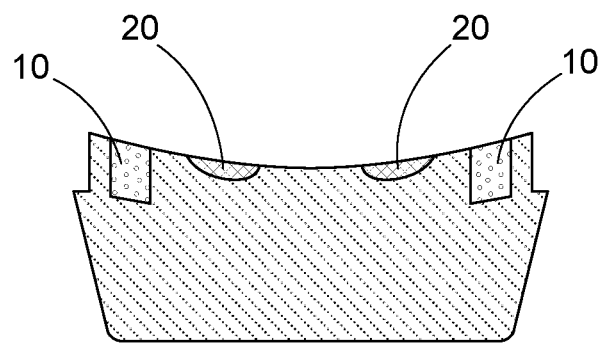
Figure 6D:
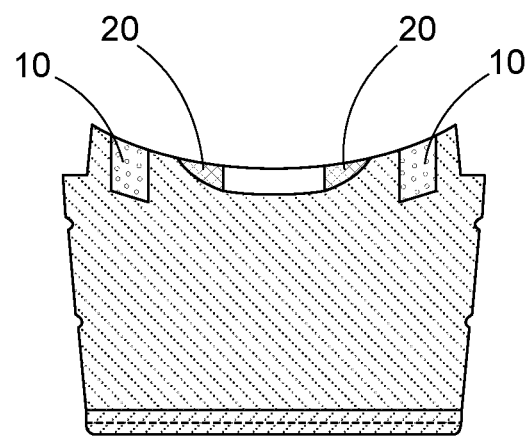

FIGS. 6C and 6D further depict cross-sections of a sole identifying sections wherein TPU is positioned in and around the EVA material of the sole.

In certain preferred embodiments, the frame is appropriately utilized in a process for manufacturing a shoe, such as a clog, wherein the frame is molded with a lightweight EVA material, a rubber bottom can be affixed to the bottom of the sole after molding, and a channel provides for an access point for molding a rigid material, such as TPU, for adhering an upper to the EVA sole. Positioned on the top of the frame is a support 20 that provides for stability and shape to the finished sole. An upper can be fastened to the sole by stapling or nailing the upper into the TPU channel that is molded into the sole.

A further embodiment is directed to a process for manufacturing a lightweight sole, having a lightweight frame, at least one channel in said frame comprising a rigid material capable of maintaining a solid object or fastener inserted thereto, wherein the rigid material has greater rigidity than lightweight frame, but is not brittle. In preferred embodiments, the lightweight material is EVA and the rigid material is TPU, however, those of skill in the art will recognize additional materials that are suitable for such application. A support is further adhered to the top of the frame and all components are molded together forming a sole. A traction pad can be optionally applied once the sole is molded, e.g. the pads 40 and 42. Rubber material, or other plastic or polymers have appropriate levels of traction, abrasion, and flexibility for the sole.

A process for molding a sole comprises the following steps:

(A) molding a frame 1 of a lightweight material, comprising a channel 3 inscribed the perimeter of the frame; and wherein the frame comprises a plurality of recesses 4 or indentations positioned from the toe to the heal, with a single large recess (heel support recess 2) positioned at the central portion of the heal.

(B) Applying a rigid material 10 into the inscribed channel 3; applying a further piece of rigid material 11 into the single large recess at the central portion of the heal and also a second rigid material 12 overlying at least one of the arch recesses 4.

(C) Applying an adhesive to a stabilizer 20.

(D) Placing the stabilizer 20 and the frame with the raw rigid material into a mold, and heating and compressing the EVA frame, rigid material, and nylon stabilizer 20 into the shape of the mold. The temperature and the pressure are applied as known to one of ordinary skill in the art, for a sufficient duration for the molding process.

(E) The mold is opened and excess material is trimmed off of the now molded sole, resulting in an EVA based sole having a stabilizer 20 embedded into the top of the material, and further comprising a rigid material within an inscribed channel, and further comprising said rigid material positioned within two openings in the stabilizer 20.

Preferably, the process uses EVA as the frame, TPU as the rigid material, and nylon as the stabilizer. Preferably the further piece of rigid material into the single large recess at the central portion of the heel 11 and also a second rigid material 12 overlying at least one of the arch recesses 4 correspond to the openings in the stabilizer 20.

After the sole is trimmed, an appropriate rubber, plastic, or leather material can be optionally added to the bottom of the sole and an upper can be fixed to the sole via a fastening mechanism, such as being stapled or nailed into the rigid material in the inscribed channel. A last is positioned within the upper and heat set to create the final shape of the upper.

The use of EVA material in a clog style shoe provides for a significant weight savings over the prior art. The EVA material, however, necessitates the use of additional features to give appropriate stability to the sole. Furthermore, as the EVA material is soft, it would not accept a standard fastening device such as a staple. Accordingly, the rigid material, e.g. TPU material within the channel is necessary to provide for a sufficiently rigid section of the sole to allow the upper to be secured to the sole.

Further embodiments are directed to a method for manufacturing a sole comprising: a frame, a rigid material, and a stabilizer, comprising the following steps: manufacturing a frame of lightweight material, said frame comprising an upper face having a plurality of recesses vertically oriented in said upper face and an inscribed channel positioned inside the edge of the sole 8 along the entire perimeter of the frame 1. Inserting into said channel a rigid material. Inserting into at least one of the recesses a rigid material. Affixing to said upper face a stabilizer, by applying an adhesive to a face of said stabilizer and applying to said upper face. Molding the frame, rigid material, and stabilizer in a suitable mold at an appropriate temperature and pressure.

In manufacturing a shoe, the above manufactured sole is then utilized for manufacturing a completed shoe. In certain embodiments, after molding, the sole is trimmed for excess material before adding the upper to the sole. A last can be affixed to the sole and an upper affixed to the rigid material in the channel. The upper is then cured or molded to give it the appropriate shape and then the last can be removed. Finally, a traction pad (40 and 42) can be added to the heel and toe portion of the sole.

What is claimed is:

1. A shoe sole comprising a frame of a lightweight polymer having an upper face and a bottom, an inscribed channel in said upper face of said frame comprising a rigid material, and a support member affixed to said upper face, wherein:
    the support member has a curvature that corresponds, when the shoe sole supports a foot of a wearer, to a curvature of the foot of the wearer,
    the support member has a heel portion and an arch portion, the entire arch portion only has a single rectangular arch hole and the entire heel portion only has a single rectangular heel hole, the single rectangular heel hole and the single rectangular arch hole each filled with the rigid material, and
    the single rectangular heel hole and single rectangular arch hole are arranged in alignment with each other and along a longitudinal direction of the shoe sole.

2. The shoe sole of claim 1 wherein said lightweight polymer is ethylene vinyl acetate.

3. The shoe sole of claim 1 wherein said rigid material is a thermoplastic polyurethane.

4. The shoe sole of claim 1 wherein the support member is a nylon support member.

5. A shoe sole having a lightweight frame comprised of an ethylene vinyl acetate ("EVA") polymer, said frame having an outer edge, an upper face, and a bottom, disposed of on said upper face and positioned inside of said outer edge is an inscribed channel, and a plurality of recesses positioned on the upper face extending vertically, a rigid material disposed of within said inscribed channel, and a support member, affixed to said upper face and positioned over at least one of said plurality of recesses positioned on the upper face, wherein:
    the support member has a curvature that corresponds, when the shoe sole supports a foot of a wearer, to a curvature of the foot of the wearer,
    the support member has a heel portion and an arch portion, the entire arch portion only has a single rectangular arch hole and the entire heel portion only has a single rectangular heel hole, the single rectangular heel hole and the single rectangular arch hole each filled with the rigid material, and
    the single rectangular heel hole and single rectangular arch hole are arranged in alignment with each other and along a longitudinal direction of the shoe sole.

6. The shoe sole of claim 5 wherein said rigid material is a thermoplastic polyurethane.

7. The shoe sole of claim 5 wherein said support member is a nylon support member.

\* \* \* \* \*